US011890635B2

(12) United States Patent
Qiao

(10) Patent No.: US 11,890,635 B2
(45) Date of Patent: Feb. 6, 2024

(54) SPRAYER

(71) Applicant: INTRADIN (SHANGHAI) MACHINERY CO., LTD., Shanghai (CN)

(72) Inventor: Xuetao Qiao, Shanghai (CN)

(73) Assignee: INTRADIN (SHANGHAI) MACHINERY CO., LTD., Shanghai (CN)

( * ) Notice: Subject to any disclaimer, the term of this patent is extended or adjusted under 35 U.S.C. 154(b) by 319 days.

(21) Appl. No.: 17/088,130

(22) Filed: Nov. 3, 2020

(65) Prior Publication Data

US 2022/0088625 A1 Mar. 24, 2022

(30) Foreign Application Priority Data

Sep. 18, 2020 (CN) ......................... 202010988367.4

(51) Int. Cl.
*B05B 5/03* (2006.01)
*B05B 15/65* (2018.01)
*B05B 5/053* (2006.01)
*B05B 12/00* (2018.01)

(52) U.S. Cl.
CPC .............. *B05B 5/03* (2013.01); *B05B 5/0533* (2013.01); *B05B 12/002* (2013.01); *B05B 15/65* (2018.02)

(58) Field of Classification Search
CPC ....... B05B 3/04; B05B 3/0418; B05B 3/0427; B05B 5/03; B05B 5/04; B05B 5/0533; B05B 12/002
See application file for complete search history.

(56) References Cited

U.S. PATENT DOCUMENTS 9,878,337 B1 * 1/2018 Hong .................... B05B 7/0075
10,322,424 B2 6/2019 Wright
2007/0048452 A1 * 3/2007 Feng ......................... B05D 1/06 427/458
2009/0148612 A1 * 6/2009 Micheli ................... B05B 15/63 427/427.3
2017/0128969 A1 * 5/2017 Yamauchi ............. B05B 3/1014
2017/0173607 A1 6/2017 Wright
2019/0060922 A1 2/2019 Wright
2020/0121867 A1 4/2020 Wright
2021/0178412 A1 * 6/2021 Ishida .................. D01D 5/0069

FOREIGN PATENT DOCUMENTS

CN 108698056 A 10/2018
EP 3862468 A1 * 8/2021 ............. B05B 5/025

* cited by examiner

*Primary Examiner* — Jason J Boeckmann

(57) ABSTRACT

A sprayer includes a sprayer casing, a power module and a spray nozzle. The sprayer casing is configured to contain a liquid. The power module is connected to the sprayer casing and is configured to energize the liquid in the sprayer casing, so that the liquid carries a first charge. The spray nozzle is connected to the sprayer casing and is configured to atomize the liquid with the first charge and spray it onto the external object with the second charge. The first charge and the second charge are opposite. The sprayer of the present invention has an excellent atomization effect and an improved the utilization rate of the atomized liquid.

10 Claims, 7 Drawing Sheets

SPRAYER

CROSS-REFERENCE TO RELATED APPLICATIONS

This application claims the benefit of priority from Chinese Patent Application No. 202010988367.4, filed on Sep. 18, 2020. The content of the aforementioned application, including any intervening amendments thereto, is incorporated herein by reference in its entirety.

TECHNICAL FIELD

The present application relates to agriculture equipment, and more particularly to a sprayer.

BACKGROUND

Sprayers atomize liquids into mists and spray them onto external objects, but the atomized liquids are easy to slip off from the external objects. Therefore, a part of the atomized liquids is wasted, causing a low utilization rate of the atomized liquids.

SUMMARY

In view of above defects, the present disclosure aims to provide a sprayer, so as to realize a high utilization rate of atomized liquids.

To achieve the above objectives, the present disclosure provides a sprayer, comprising:

- a sprayer casing, comprising a cavity for containing a liquid;
- a power module, connected to the sprayer casing and configured to energize the liquid in the cavity to make the liquid carry a first charge; and
- a spray nozzle, connected to the sprayer casing and configured to atomize the liquid with the first charge and spray it onto an external object with a second charge, wherein the first charge and the second charge are opposite.

In some embodiments, the sprayer further comprises a blower. One end of the blower is connected to the sprayer casing, and the other end of the blower is connected to the spray nozzle. The blower is configured to provide the spray nozzle with a force that allows the atomized liquid with the first charge in the cavity to be sprayed onto the external object with the second charge.

In some embodiments, the sprayer further comprises a connection part, wherein one end of the connection part is connected to the sprayer casing, and the other end of the connection part is connected to the blower.

In some embodiments, the sprayer further comprises a handle which is movably connected to the connection part.

In some embodiments, the spray nozzle comprises a spray nozzle casing, a transmission part and a spray component. The transmission part and the spray component are both are arranged in the spray nozzle casing; the transmission part is connected to the spray component and the spray nozzle casing, respectively; the spray nozzle casing is connected to the blower; and the blower is configured to provide a force to allow the spray component to rotate, so that the spray component is rotatable with respect to the transmission part to form a vacuum inside the spray component.

In some embodiments, the spray component comprises a blade component and an outlet. The outlet is connected to the blade component and has an opening; the transmission part passes through the blade component and extends into the outlet; the blower is configured to provide a force to allow the blade component to rotate; and the blade component drives the outlet to rotate with respect to the transmission part to form a vacuum inside the outlet.

In some embodiments, the outlet is flared towards an end of the outlet away from the blade component.

In some embodiments, the blade component comprises a fan blade and a connecting pipe. The fan blade and the outlet are arranged on the connecting pipe, and the transmission part is arranged in one end of the connecting pipe. The fan blade is rotatable with respect to the transmission part, so as to drive the outlet to rotate synchronously through the connecting pipe.

In some embodiments, the sprayer further comprises an electrode assembly, wherein the electrode assembly extends into the cavity to allow the electrode assembly to contact the liquid, and the electrode assembly is electrically connected to the power module.

In some embodiments, the sprayer further comprises an energy supply part which is electrically connected to the power module and is configured to provide electrical energy to the power module.

The present invention has the following advantages. The power module energizes the liquid in the cavity so that the liquid carries the first charge, and then the spray nozzle sprays the liquid with the first charge onto the external object with the second charge. Since the atomized liquid carries the first charge, the atomized liquid can be attached onto the external object with the second charge, so that the external object can fully absorb the atomized liquid, which improves the utilization rate of the atomized liquid. In addition, since the liquid carries the first charge, there is a repulsive force in the liquid, which makes the liquids more dispersed so as to get better atomization effect.

BRIEF DESCRIPTION OF THE DRAWINGS

Advantages and features of the present disclosure will be obvious from the following description in conjunction with the embodiments. It is apparent that the drawings in the following description are only some embodiments of the present disclosure. Those of ordinary skill in the art can also obtain other drawings based on the structure shown in these drawings without making creative efforts.

In this drawings: 100, sprayer casing; 101, third hole; 102, fourth hole; 103, cavity; 110, power module; 120, spray nozzle; 121, spray nozzle casing; 122, transmission part; 123, spray component; 1231, blade component; 12311, fan blade; 12312, connecting pipe; 12313, second thread;

12314, first hole; 1232, outlet; 12321, opening; 12322, first thread; 124, bearing; 125, bearing positioning member; 126, fixing part; 127, vent pipe; 130, blower; 140, electrode assembly; 150, solenoid valve; 160, connection part; 161, second hole; 170, energy supply part; 180, switch button; 190, lock part; 200, handle; 210, cover; 220, first tube; 230, second tube; 240, grip.

The present disclosure will be further illustrated below with reference to the accompanying drawings, from which the objectives, functions, features and advantages become obvious.

DETAILED DESCRIPTION OF EMBODIMENTS

The invention will be further described clearly and completely below with reference to the accompanying drawings in embodiments. Obviously, the described embodiments are only a part of the embodiments of the present invention, but not all the embodiments. Based on the embodiments of the present invention, all other embodiments obtained by those of ordinary skill in the art without making creative efforts, fall within the protection scope of the present invention.

It should be noted that all directional indications (such as up, down, left, right, front, rear, etc.) in the embodiment of the present invention are only used to explain the relative position relationship, movement situation, etc. between the components under a certain attitude (as shown in the attached figure). If the specific posture changes, the directional indication changes accordingly. In addition, terms "first", "second", etc. in the present disclosure are only for descriptive purposes, and cannot be understood as indicating or implying their relative importance or implicitly indicating the number of technical features indicated. Thus, the features defined as "first" or "second" may explicitly or implicitly indicate that at least one of the features is included. The term "and/or" includes any one of or any combination of two or more of the listed items. In addition, various embodiments can be combined with each other, in a manner that enables the implementation of the present invention by those skilled in the art, and the combination of the embodiments that is expected in an inappropriate way will not be considered as falling within the spirit of the present invention.

The specific structures of the sprayer of the present disclosure are described as follows.

Figure 1:
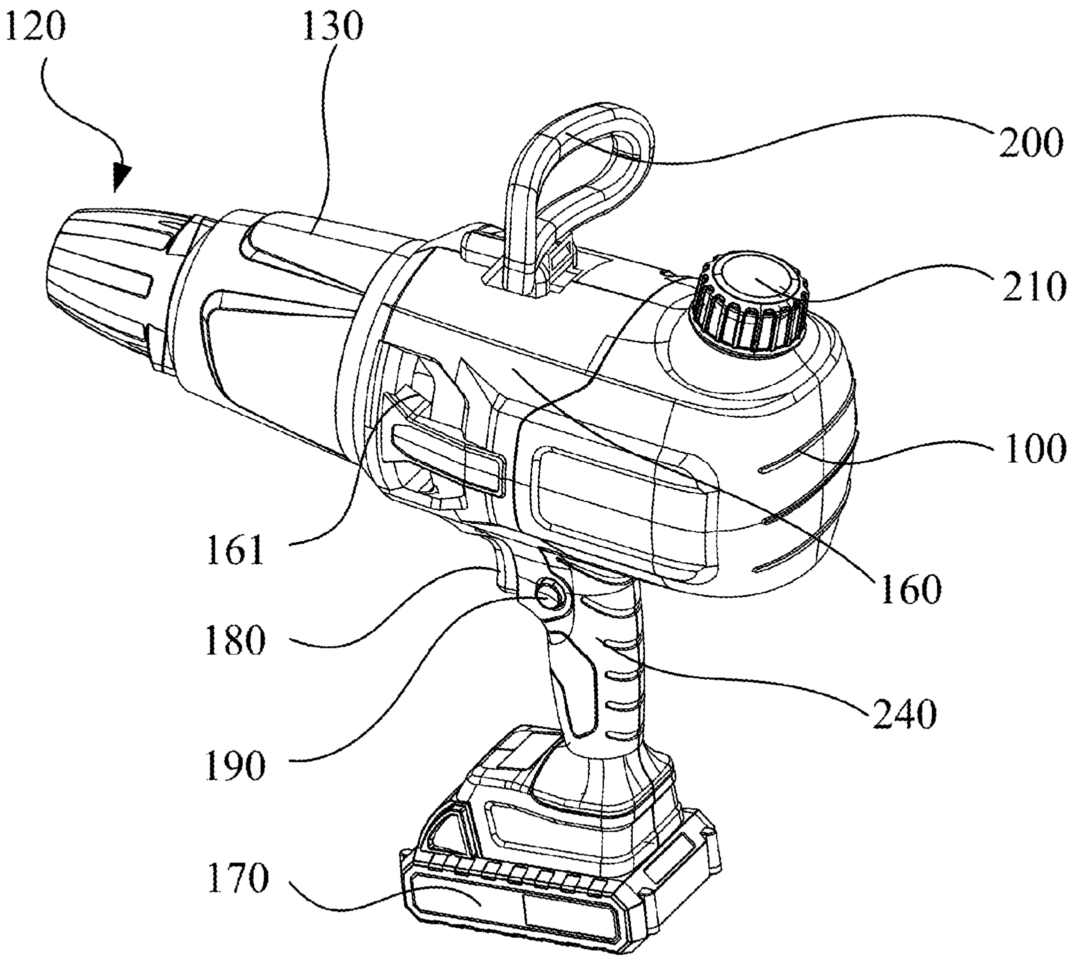
FIG. 1 is an axonometric view of a sprayer according to an embodiment of the present disclosure.
Figure 2:
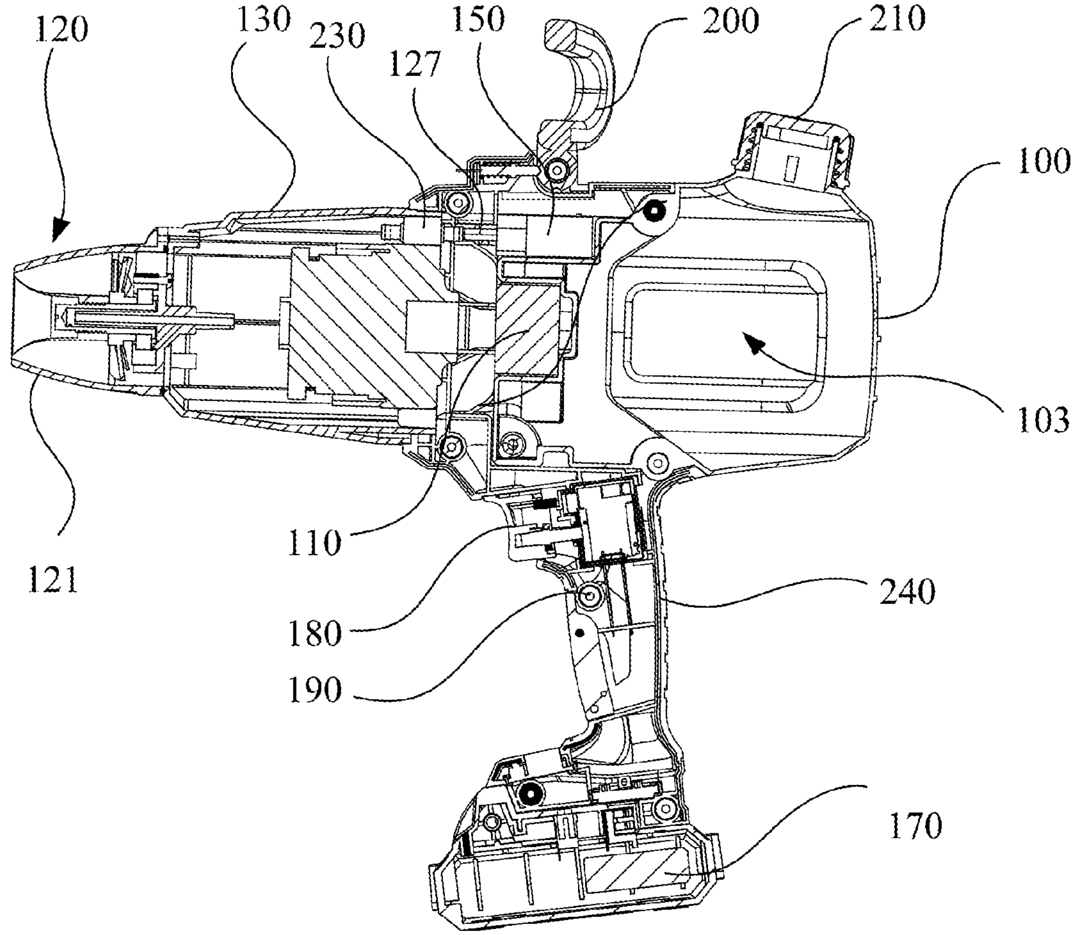
FIG. 2 is a cross-sectional view of the sprayer according to an embodiment of the present disclosure.

As shown in FIGS. 1-2, a sprayer includes a sprayer casing 100, a power module 110 and a spray nozzle 120. The sprayer casing 100 is provided with a cavity 103 for containing a liquid. The power module 110 is connected to the sprayer casing 100, and is configured to energize the liquid in the cavity 103, so that the liquid carries a first charge. The spray nozzle 120 is connected to the sprayer casing 100, and is configured to atomize the liquid with the first charge and spray it onto the external object which carries a second charge, and the first charge and the second charge are opposite.

The power module 110 energizes the liquid in the cavity 103 so that the liquid carries the first charge, and then the spray nozzle 120 sprays the liquid with the first charge onto the external object with the second charge. Since the atomized liquid carries the first charge, the atomized liquid can be attached onto the external object with the second charge, so that the external object can fully absorb the atomized liquid, which improves the utilization rate of the atomized liquid. In addition, since the liquid carries the first charge, there is a repulsive force in the liquid, which makes the liquid more dispersed, so as to get better atomization effect.

In some embodiments, the first charge is positive, and the second charge is negative.

The sprayer further includes a blower 130, where one end of the blower 130 is connected to the sprayer casing 100, and the other end of the blower 130 is connected to the spray nozzle 120. The blower 130 is configured to provide the spray nozzle 120 with a force that allows the atomized liquid with the first charge in the cavity 103 to be sprayed onto the external object with the second charge.

As shown in FIG. 1, the sprayer further includes a connection part 160, where one end of the connection part 160 is connected to the sprayer casing 100, and the other end of the connection part 160 is connected to the blower 130.

As shown in FIG. 1, the sprayer further includes a handle 200 which is movably connected to the connection part 160. The handle 200 is rotatable with respect to the connection part 160, so that the end of the handle 200 away from the connection part 160 can approach or move away from the connection part 160. Specifically, the end of the handle 200 away from the connecting portion 160 can swing due to the movable connection between the handle 200 and the connection part 160. When the sprayer does not need to be transferred, the swingable end of the handle 200 can be moved to be close to the connection part 160, so that the handle 200 is attached to the connection part 160, which can save space. When the sprayer needs to be transferred, the handle 200 is rotated to allow the swingable end of the handle 200 to be moved away from the connection part 160, and the handle 200 is rotated to a suitable position with respect to the connection part 160 to hands to hold the handle 200, which facilitates the transfer of the sprayer.

In an embodiment, as shown in FIG. 1, the sprayer further includes a grip 240 which is connected to the connection part 160 and/or the sprayer casing 100, and the sprayer is held through the grip 240. Specifically, the grip 240 is held to control the sprayer during the operation.

In some embodiments, the grip 240 and the connection part 160 are integrally formed.

Figure 3:
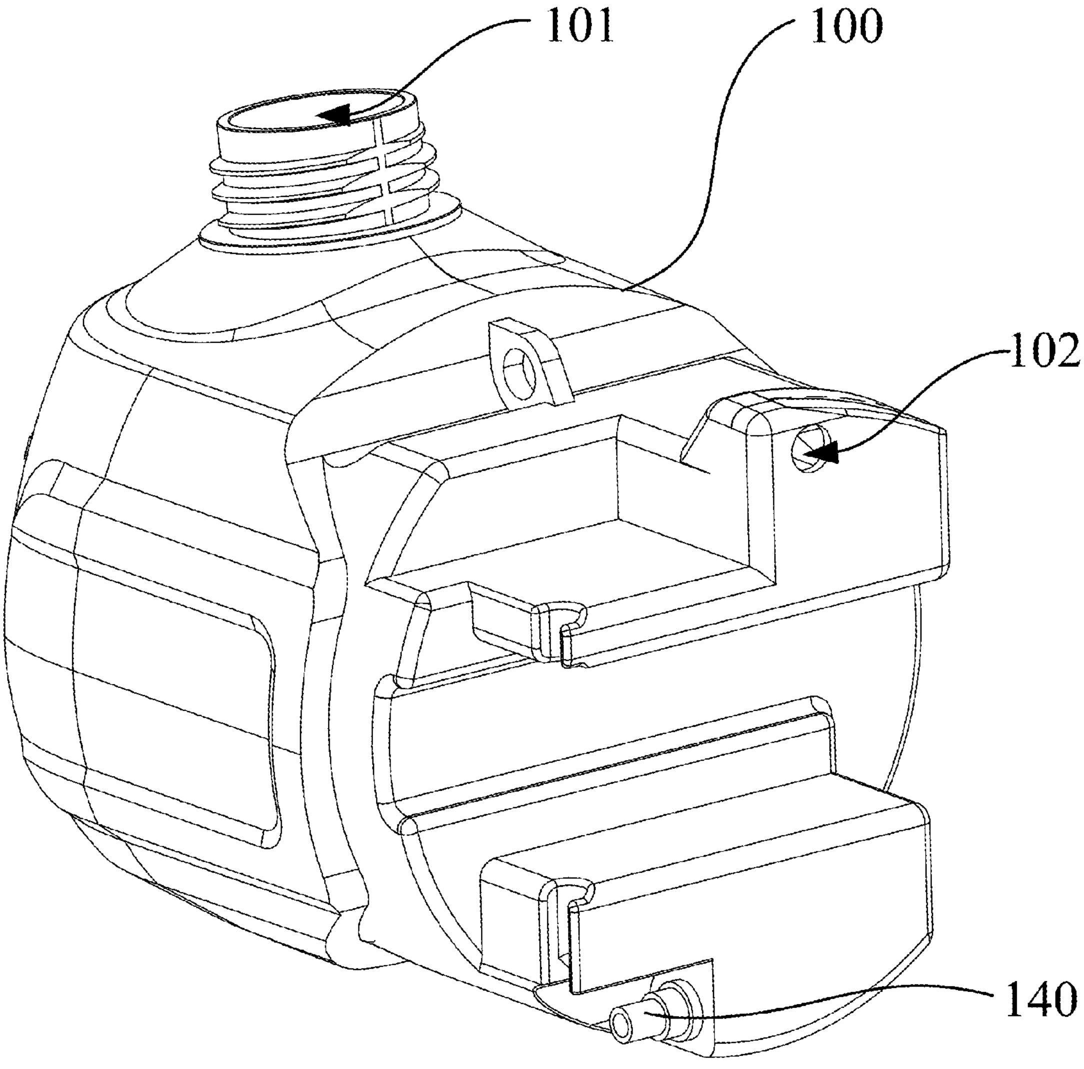
FIG. 3 is an axonometric view of a sprayer casing according to an embodiment of the present disclosure.

As shown in FIGS. 2-3, the sprayer further includes an electrode assembly 140 that partially extends into the cavity 103, so that the electrode assembly 140 is in contact with the liquids in the cavity 103. The electrode assembly 140 is electrically connected to the power module 110. The electrode assembly 140 can conduct electricity, so that the power module 110 energizes the liquid in the cavity 103 through the electrode assembly 140. Specifically, the power module 110 outputs the first charge to the electrode assembly 140, and the liquid in the cavity 103 is energized because the electrode assembly 140 is conductive and in contact with the liquid, so that the liquid in the cavity 103 carries the positive charge.

Figure 4:
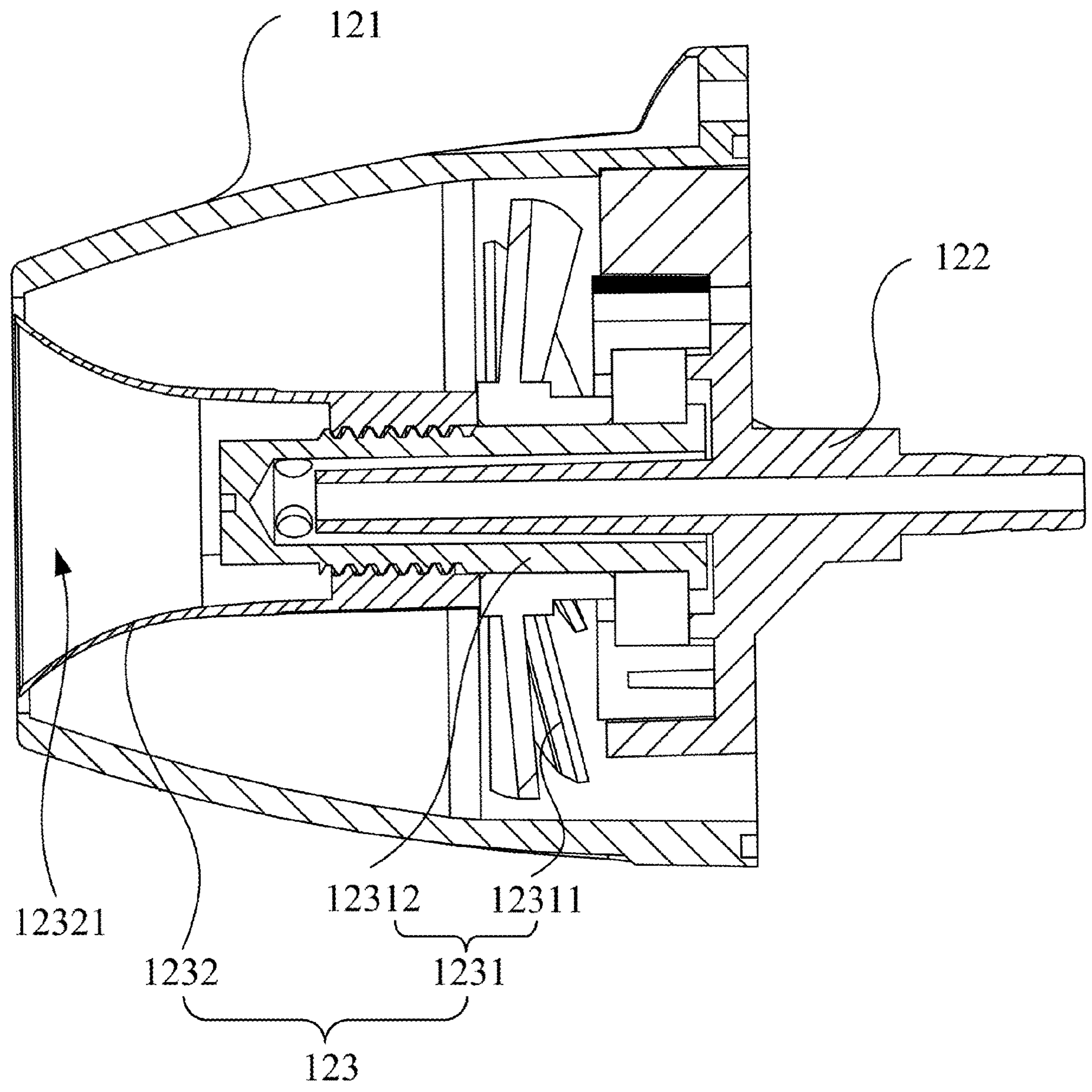
FIG. 4 is a cross-sectional view of a spray nozzle according to an embodiment of the present disclosure.

As shown in FIGS. 2 and 4, the spray nozzle 120 includes a spray nozzle casing 121, a transmission part 122 of tubular structure and a spray component 123. The transmission part 122 and the spray component 123 are both equipped in the spray nozzle casing 121, and the transmission part 122 is connected to the spray component 123 and the spray nozzle casing 121, respectively. The spray nozzle casing 121 is connected to the blower 130. The blower 130 is configured to make the spray component 123 rotate with respect to the transmission part 122 to form a vacuum inside the spray component 123. In the case, the liquid to be atomized under atmospheric pressure flows into the spray component 123 through the transmission part 122, and the spray component 123 can also drive the liquid to rotate, so that the liquid is atomized and is sprayed out of the spray component 123. In the embodiment, the wind generated by the blower 130 drives the spray component 123 to rotate with respect to the transmission part 122. Specially, the liquid flowing into the spray component 123 rotates together with the spray component 123, so that the liquid is more evenly distributed in the spray component 123 to get the better atomization effect.

As shown in FIG. 4, the spray component 123 includes a blade component 1231 and an outlet 1232 that is connected to the blade component 1231. The outlet 1232 has an opening 12321. The transmission part 122 passes through the blade component 1231 and extends into the outlet 1232. The blower 130 provides the force to allow the blade component 1231 to rotate with respect to the transmission part 122 to form a vacuum inside the outlet 1232. In the case, the liquid under the atmospheric pressure flows into the opening 12321 through the transmission part 122, and the outlet 1232 can also drive the liquid to rotate, so that the liquid is atomized and sprayed out of the outlet 1232 through the opening 12321. In the embodiment, the wind generated by the blower 130 drives the blade component 1231 to rotate.

As shown in FIG. 4, the outlet 1232 is flared towards an end of the outlet 1232 away from the blade component 1231, which facilitates the outward spraying of the liquid entering the outlet 1232 and more uniform distribution of the liquid, thus resulting a better atomization effect of the liquid. In other embodiments, the outlet 1232 is, but not limited to, a flared shape.

As shown in FIG. 4, the blade component 1231 includes a fan blade 12311 and a connecting pipe 12312, where the fan blade 12311 and the outlet 1232 are sleeved on the connecting pipe 12312, and the transmission part 122 is inserted in one end of the connecting pipe 12312. The fan blade 12311 is rotatable with respect to the transmission part 122, and drives the outlet 1232 to rotate synchronously through the connecting pipe 12312 to form a vacuum in the outlet 1232. Therefore, the liquid under the atmospheric pressure can flow into the outlet 1232 through the transmission part 122 and the connecting pipe 12312. Specifically, the rotation of the fan blade 12311 can also generate wind which blows the liquid sprayed out from the opening 12321 of the outlet 1232, so that the liquid is further atomized, and the atomized liquid is sprayed further.

Figure 5:
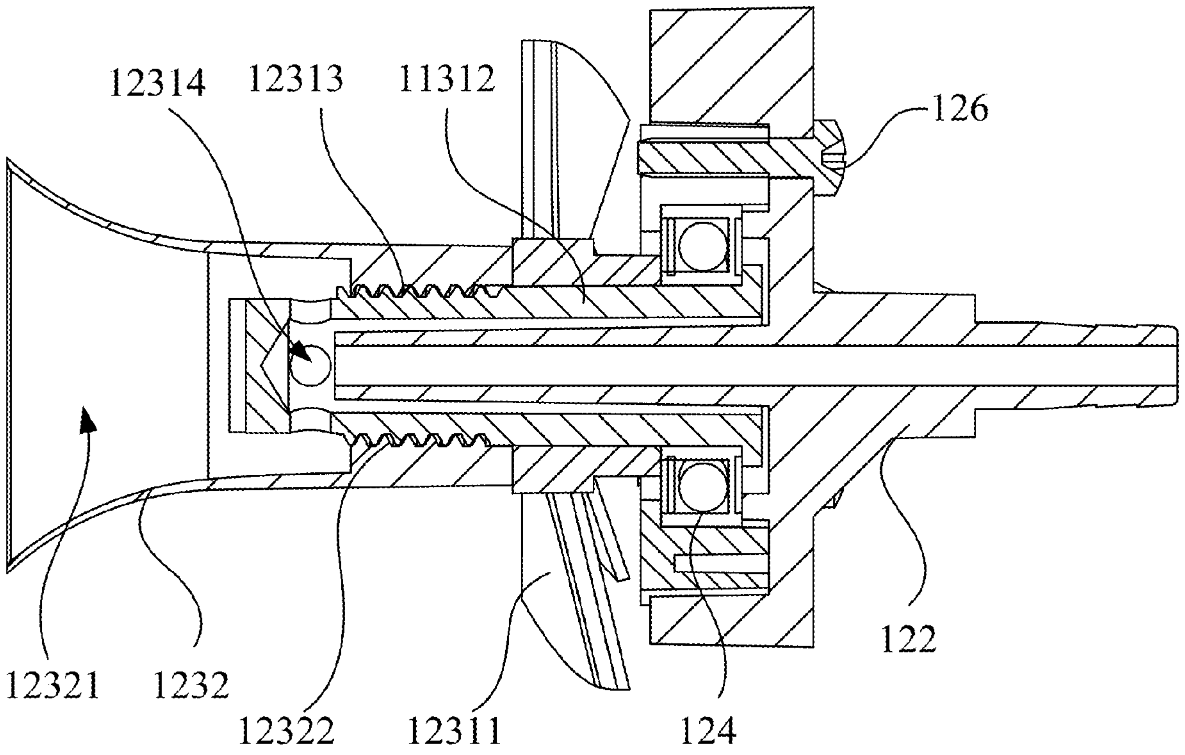
FIG. 5 is a cross-sectional view of the spray nozzle without a spray nozzle casing according to an embodiment of the present disclosure.

As shown in FIG. 5, an inner wall of the outlet 1232 is provided with a first thread 12322, and an outer wall of the connecting pipe 12312 is provided with a second thread 12313. The first thread 12322 and the second thread 12313 engage with each other, so that the outlet 1232 and the connecting pipe 12312 are fixedly connected. Specifically, the first thread 12322 is an internal thread, and the second thread 12313 is an external thread.

As shown in FIG. 5, a side wall of the connecting pipe 12312 is provided with a first hole 12314 to allow the connecting pipe 12312 and the outlet 1232 to communicate with each other. Specifically, the first hole 12314 is, but not limited to, a circle. There are a plurality of first holes 12314 that are spaced on the side wall of the connecting pipe 12312. Because of the arrangement of the plurality of the first holes 12314, the liquid flowing through the connecting pipe 12312 can flow into the outlet 1232 from different directions to realize the better dispersion of the liquid inside of the outlet 1232, thereby realizing a better atomization effect of the liquid. In the embodiment, there are four first holes 12314 which are spaced apart and are arranged on the side wall of the connecting pipe 12312. Because of the arrangement of four first holes 12314, the liquid flowing through the connecting pipe 12312 can flow into the inside of the outlet 1232 from different directions. It should be understood that, in other embodiments, the specific number of the first holes 12314 can be selected reasonably according to the actual situation and is not limited herein.

As shown in FIG. 5, the spray nozzle 120 also includes a bearing 124 which is arranged on the spray component 123 and is configured to support the spray component 123. The spray component 123 is rotatably connected to the transmission part 122 through the bearing 124. Specifically, the bearing 124 is configured to ensure the rotation accuracy of the spray component 123 and reduce the friction coefficient of the spray component 123 during rotating.

Figure 6:
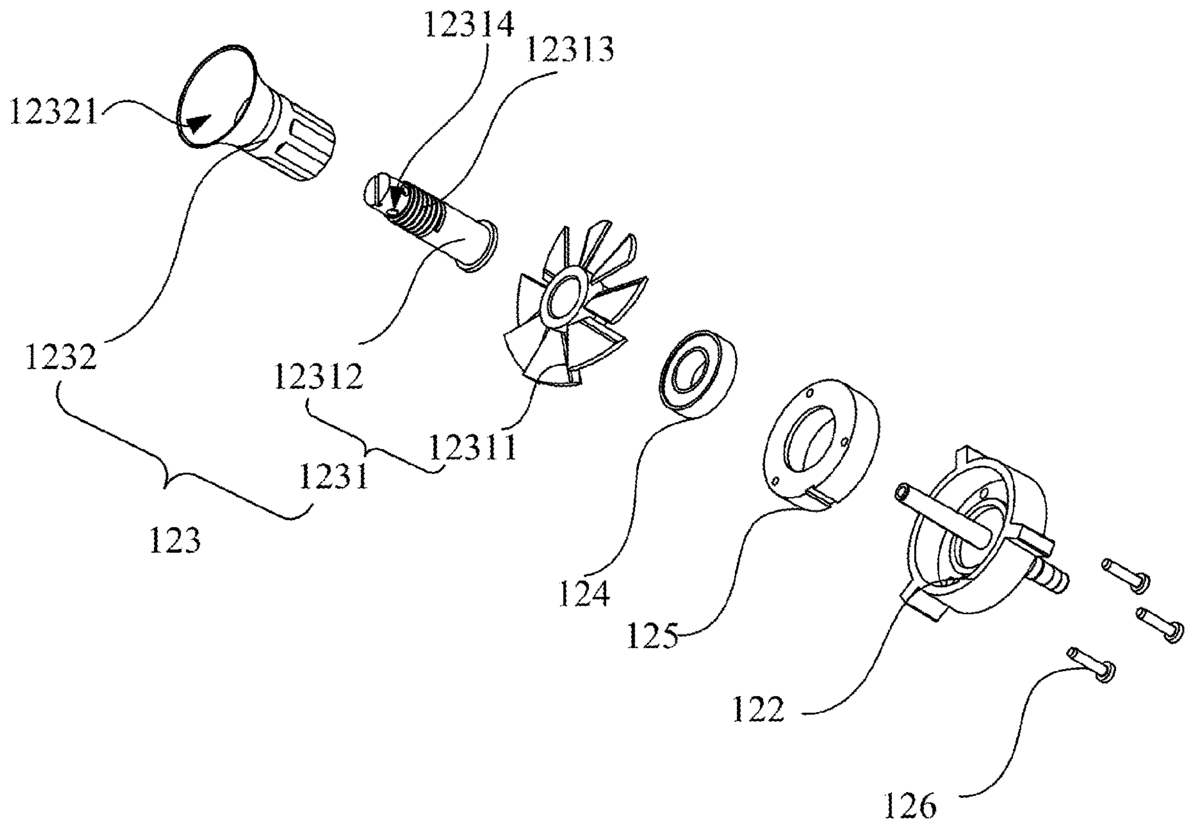
FIG. 6 is an exploded view of the spray nozzle without the spray nozzle casing according to an embodiment of the present disclosure.

As shown in FIGS. 5-6, the spray nozzle 120 also includes a bearing positioning member 125 which is arranged on the bearing 124 and is configured to position the bearing 124. The bearing positioning member 125 is connected to the transmission part 122. The spray component 123 is connected to the transmission part 122 through the bearing 124 and the bearing positioning member 125. Specifically, the bearing positioning member 125 is, but not limited to, a circular ring.

As shown in FIGS. 5-6, the spray nozzle 120 also includes a fixing part 126, where the bearing positioning member 125 is connected to the transmission part 122 through the fixing part 126. In some embodiments, the number of the fixing parts 126 is more than one, and the fixing parts 126 are spaced apart and connect with the bearing positioning members 125 through the transmission parts 122, so that the bearing positioning member 125 and the transmission part 122 can be firmly connected through the fixing parts 126. In the embodiment, there are three fixing parts 126 that are spaced apart and is connected to the bearing positioning member 125 through the transmission part 122. It can be understood that, in other embodiments, the specific number may be selected reasonably in according with the actual conditions and is not limited herein. In this embodiment, the fixing parts 126 are, but not limited to, screws.

In some embodiments, the sprayer also includes a water pipe, where one end of the water pipe is connected to the sprayer casing 100, and the other end of the water pipe is connected to the transmission part 122. The liquid in the cavity 103 flows into the spray component 123 through the water pipe and the transmission part 122.

As shown in FIG. 2, the sprayer also includes a solenoid valve 150, where the solenoid valve 150 is arranged on the water pipe and is configured to control the liquid in the water pipe. Specifically, when the solenoid valve 150 is on, the liquid in the cavity 103 flows into the spray nozzle 120 through the solenoid valve 150 and the water pipe. When the solenoid valve 150 is off, the liquid cannot flow into the spray nozzle 120 from the cavity 103 through the solenoid valve 150 and the water pipe. In addition, when the sprayer is not in use, the solenoid valve 150 is in the off state to prevent the liquid from flowing into the spray nozzle 120 through the solenoid valve 150 and the water pipe, so as to prevent the liquid from leaking from the spray nozzle 120.

In some embodiments, one end of the solenoid valve 150 penetrates through the electrode assembly 140 and extends into the sprayer casing 100, and the other end of the solenoid valve 150 is connected to the end of the water pipe away from the transmission part 122. Specifically, since the solenoid valve 150 penetrates the electrode assembly 140 and extends into the sprayer casing 100, there is no need to provide an additional hole on the sprayer casing 100 to allow the solenoid valve 150 to pass through.

As shown in FIG. 1, the inside of the connection part 160 communicates with the inside of the blower 130. The connection part 160 is provided with a second hole 161 from which air flows into or out of the inside of the connection part 160 and the blower 130. This allows the inside of the blower 130 to communicate with the outside of the sprayer, so as to ensure the normal operation of the blower 130.

As shown in FIG. 1, the sprayer also includes an energy supply part 170 which is electrically connected to the power module 110 and is configured to provide electrical energy to the power module 110. Specifically, the energy supply part 170 provides electrical energy for the power module 110 without an external power source, in which wires for connecting the external power source are omitted, thus rendering the use of the sprayer more convenient. In the embodiment, the energy supply part 170 is a DC power supply. The DC power supply is more convenient since the rectification and the filtering are not necessary for the DC power supply.

In some embodiments, the energy supply part 170 is electrically connected to the blower 130 and the solenoid valve 150, and is configured to provide electrical energy for the blower 130 and the solenoid valve 150. Specifically, the energy supply part 170 is connected to the grip 240.

As shown in FIG. 1, the sprayer also includes a switch button 180 which is configured to control the start and stop of the sprayer. Specifically, the switch button 180 is configured to control the blower 130, the power module 110 and the solenoid valve 150. When the switch button 180 is pressed, the blower 130 and the power module 110 start to work, and at the same time the solenoid valve 150 is in the on state. When the switch button 180 is released, the blower 130 and the power module 110 stop working, and at the same time the solenoid valve 150 is in the off state. Specifically, when the switch button 180 is pressed, the solenoid valve 150 is in the on state after a predetermined period to ensure that the liquid in the cavity 103 has been energized by the power module 110.

As shown in FIG. 1, in some embodiments, the switch button 180 is arranged on the grip 240.

As shown in FIG. 1, the sprayer also includes a lock part 190 which is configured to lock the switch button 180 when the switch button 180 is pressed. Specifically, when the sprayer needs to work for a long time, the switch button 180 is pressed and then the lock part 190 is pressed to lock the switch button 180 in the pressed state. This configuration makes the use of the sprayer more convenient because it is not necessary to manually press the switch button 180 for a long time. In addition, the sprayer can be stopped by pressing the switch button 180 again to reset the switch button 180.

As shown in FIG. 1, in some embodiments, the lock part 190 is arranged on the grip 240.

As shown in FIG. 3, the sprayer casing 100 is provided with a third hole 101 which allows the inside of the sprayer housing 100 to communicate with the outside. This configuration allows the user to inject the liquid into the cavity 103 of the sprayer casing 100 from the third hole 101.

As shown in FIGS. 1 and 3, the sprayer also includes a cover 210, where the cover 210 is arranged on the third hole 101 of the sprayer casing 100. Specifically, after the liquid is injected into the sprayer casing 100, the cover 210 is covered on the third holes 101 of the sprayer casing 100 to prevent the liquid from spilling out of the sprayer casing 100 through the third holes 101. At the same time, it can prevent the external dirt from entering the cavity 103 from the third hole 101 on the sprayer casing 100.

The sprayer also includes a vent pipe 127, where one end of the vent pipe 127 is connected to the blower 130, and the other end of the vent pipe 127 extends into the sprayer casing 100. The vent pipe 127 is configured to introduce the wind generated by the blower 130 into the cavity 103 of the sprayer casing 100 to obtain a greater pressure in the cavity 103. On the one hand, the outlet 1232 rotates with respect to the transmission part 122 to form a vacuum inside the outlet 1232, so that the liquid under atmospheric pressure flows into the interior of the outlet 1232 through the transmission part 122. On the other hand, the vent pipe 127 passes the wind generated by the blower 130 into the cavity 103 of the sprayer casing 100 to obtain a greater pressure in the cavity 103, such that the liquid in the cavity 103 can flow into the outlet 1232 more quickly.

The sprayer casing 100 is provided with a fourth hole 102 which allows the inside of the sprayer casing 100 to communicate with the outside.

Figure 7:
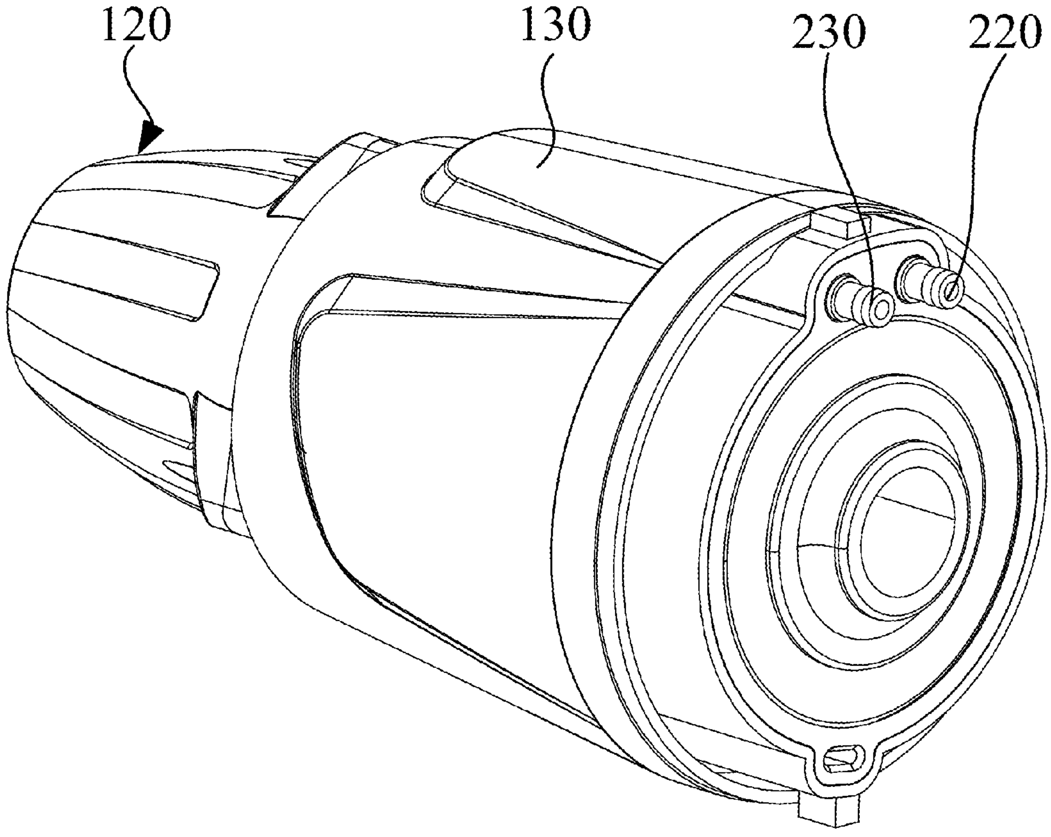
FIG. 7 is an axonometric view of a structure formed by the spray nozzle and a blower according to an embodiment of the present disclosure.

As shown in FIG. 7, the sprayer also includes a first tube 220, where the first tube 220 passes through a side wall of the blower 130 and partially extends into the blower 130. The water pipe is connected to the transmission part 122 through the first tube 220, so that the liquid in the cavity 103 can flow into the spray component 123 through the solenoid valve 150, the water pipe, the first tube 220 and the transmission part 122.

In some embodiments, the water pipe includes a first sub-pipe and a second sub-pipe, where an end of the first sub-pipe is connected to the solenoid valve 150, and the other end of the first sub-pipe is connected to the end of the first tube exposed outside the blower 130. An end of the second sub-pipe is connected to the end of the first tube 220 extending into the blower 130, and the other end of the second sub-pipe is connected to the transmission part 122. The liquid in the cavity 103 can flow into the spray component 123 through the solenoid valve 150, the first sub-pipe, the first tube 220, the second sub-pipe and the transmission part 122.

As shown in FIG. 7, the sprayer also includes a second tube 230, where the second tube 230 passes through the side wall of the blower 130 and partially extends into the blower 130. The second tube 230 and the first tube 220 are spaced apart. The vent pipe 127 extends into the blower 130 through the second tube 230, and the wind generated by the blower 130 passes through the second tube 230 and the vent pipe 127 and enters the cavity 103 of the sprayer casing 100.

Referring to FIGS. 1-7, the working principles of the sprayer are described as follows.

The grip 240 is held, and then the switch button 180 is pressed to allow the blower 130 and the power module 110 to work. The solenoid valve 150 is on after a predetermined period. The power module 110 energizes the liquid in the cavity 103 through the electrode assembly 140 to make the liquid to carry a first charge. The blower 130 drives the fan blade 12311 to rotate, and then the fan blade 12311 drives the outlet 1232 to rotate to generate a vacuum in the outlet 1232, so that the liquid in the cavity 103 under the atmospheric pressure flows into the outlet 1232 through the solenoid valve 150, the first sub-pipe, the first tube 220, the second sub-pipe and the transmission part 122. The liquid in the outlet 1232 rotates with the outlet 1232, and is atomized and sprayed onto an external object through the opening 12321. The wind generated by the blower 130 further atomizes the liquid sprayed from the opening 12321. Besides, the atomized liquid can be sprayed for a longer distance. Since the sprayed liquid carries the first charge, the external object carrying the second charge attracts the atomized liquid, and thus the external object can fully absorb the atomized liquid, which improves the utilization rate of the atomized liquid. In addition, since the liquid carries the first charge, there will be a repulsive force in the liquid, which makes the liquid more dispersed so as to get better atomization effect. When the spraying is finished, the blower 130 and the power module 110 stop working, and the solenoid valve 150 is turned off without pressing the switch button 180 again. Further, when the sprayer needs to work for a long time, the switch button 180 is pressed and then the lock part 190 is pressed to lock the switch button 180 in the pressed state. This configuration makes the sprayer more convenient to use because it is not necessary to manually press the switch button 180 for a long time. The sprayer can be stopped by pressing the switch button 180 again to reset the switch button 180.

Described above are only preferred embodiments of the present disclosure, which are not intended to limit the scope of the present disclosure. Any changes, equivalent modifications and improvements based on the concept of the present disclosure and uses in all other related technical fields, shall fall within the protection scope of the present disclosure.

What is claimed is:

1. A sprayer, comprising:

a sprayer casing, comprising a cavity for containing a liquid;

a power module, connected to the sprayer casing and configured to energize the liquid in the cavity to make the liquid carry a first charge;

a blower;

a spray nozzle, connected to the sprayer casing and configured to atomize the liquid with the first charge and spray it onto an external object with a second charge, wherein the first charge and the second charge are opposite; and a vent pipe;

wherein the blower is provided between the cavity and the spray nozzle; the spray nozzle comprises a spray nozzle casing, a transmission part and a spray component;

the spray nozzle casing is connected to the blower; and the blower is configured to provide a force to allow the spray component to rotate, so that the spray component is rotatable with respect to the transmission part to form a vacuum inside the spray component; and one end of the vent pipe is connected to the blower, and an other end of the vent pipe extends into the sprayer casing; and the vent pipe is configured to introduce a wind generated by the blower into the cavity of the sprayer casing to obtain a pressure in the cavity.

2. The sprayer of claim 1, wherein one end of the blower is connected to the sprayer casing, and the other end of the blower is connected to the spray nozzle; and the blower is configured to provide the spray nozzle with a force that allows the atomized liquid with the first charge in the cavity to be sprayed onto the external object with the second charge.

3. The sprayer of claim 2, further comprising a connection part; wherein one end of the connection part is connected to the sprayer casing, and the other end of the connection part is connected to the blower.

4. The sprayer of claim 3, further comprising a handle; wherein the handle is connected to the connection part, and the handle is rotatable with respect to the connection part.

5. The sprayer of claim 2, wherein the transmission part and the spray component are both arranged in the spray nozzle casing; the transmission part is connected to the spray component and the spray nozzle casing, respectively.

6. The sprayer of claim 5, wherein the spray component comprises a blade component and an outlet; the outlet is connected to the blade component and has an opening; and the transmission part passes through the blade component and extends into the outlet; and the blower is configured to provide a force to allow the blade component to rotate, and the blade component drives the outlet to rotate with respect to the transmission part to form a vacuum inside the outlet.

7. The sprayer of claim 6, wherein the outlet is flared towards an end of the outlet away from the blade component.

8. The sprayer of claim 6, wherein the blade component comprises a fan blade and a connecting pipe; the fan blade and the outlet are arranged on the connecting pipe, and the transmission part is inserted in one end of the connecting pipe; and the fan blade is rotatable with respect to the transmission part, so as to drive the outlet to rotate synchronously through the connecting pipe.

9. The sprayer of claim 1, further comprising an electrode assembly, wherein the electrode assembly extends into the cavity to allow the electrode assembly to contact with the liquid; and the electrode assembly is electrically connected to the power module.

10. The sprayer of claim 1, further comprising an energy supply part which is electrically connected to the power module and is configured to provide electrical energy to the power module.

* * * * *